United States Patent [19]

Rupprecht et al.

[11] Patent Number: 4,696,181
[45] Date of Patent: Sep. 29, 1987

[54] DECOUPLING SUSPENSION SYSTEM FOR AN OSCILLATING ELEMENT MICROBALANCE

[75] Inventors: Georg Rupprecht, Voorheesville; David R. Hassel, Troy, both of N.Y.

[73] Assignee: Rupprecht & Patashnick Co., Inc., Albany, N.Y.

[21] Appl. No.: 850,290

[22] Filed: Apr. 10, 1986

[51] Int. Cl.[4] .................... G01G 3/16; G01G 21/23
[52] U.S. Cl. .................... 73/580; 177/187; 177/210 FP
[58] Field of Search .............. 73/580, DIG. 1, 28, 73/430; 177/184, 187, 210 FP; 248/638

[56] References Cited

U.S. PATENT DOCUMENTS 3,492,858  2/1970  Heflinger et al. .................... 73/580
3,926,271 12/1975  Patashnick .................... 177/210 FP
4,158,395  6/1979  Brown .................... 177/210 FP
4,391,338  7/1983  Patashnick et al. .................... 177/210 FP Primary Examiner—John Chapman
Attorney, Agent, or Firm—Heslin & Rothenberg

[57] ABSTRACT

A suspension system (11) for effectively decoupling an oscillating element microbalance (10) from its environment employs longitudinally extending suspension members axially aligned with an instantaneous center of rotation (S) of the microbalance. In a preferred embodiment, the microbalance includes a tapered elongate elastic element (12) having an elliptical cross section and the suspending members comprise a torsion bar arrangement (20, 22) oriented parallel to the major axis (HD) of the elliptical cross section. The suspension system minimizes vibrational losses from the microbalance while at the same time rendering environmental noise ineffectual.

18 Claims, 9 Drawing Figures

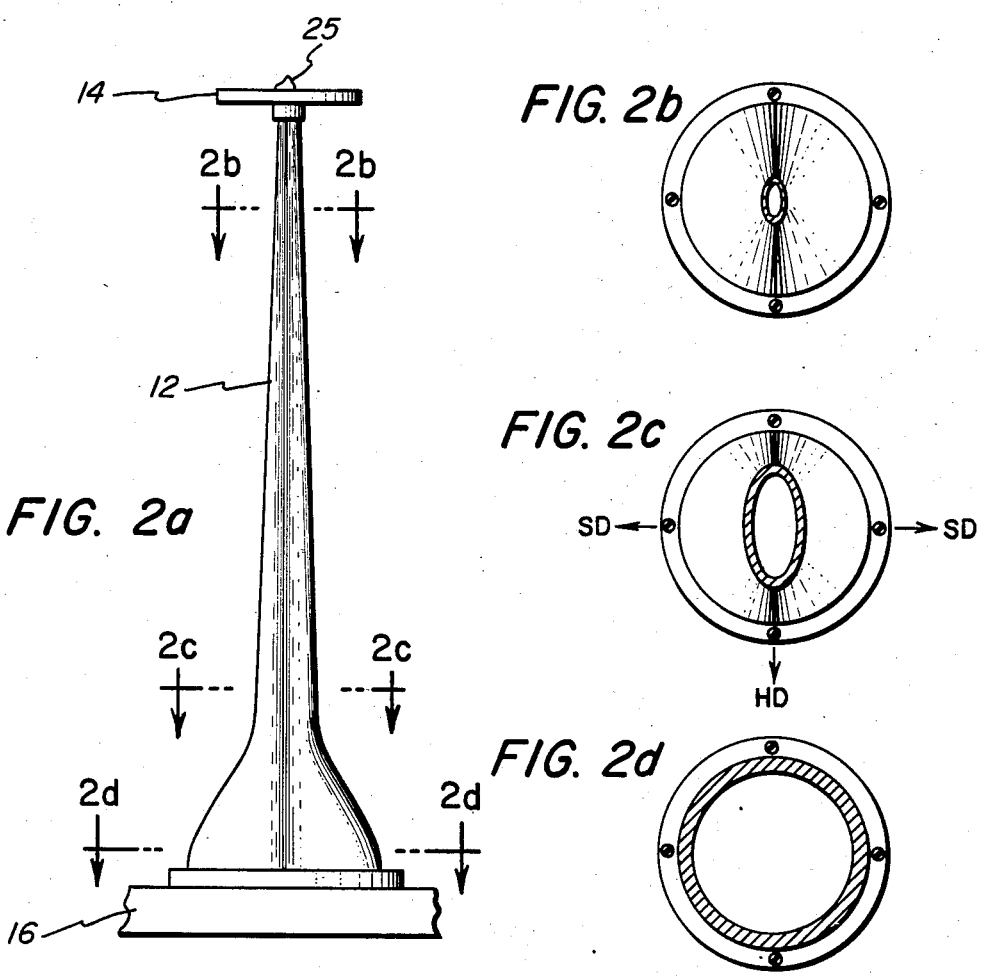

DECOUPLING SUSPENSION SYSTEM FOR AN OSCILLATING ELEMENT MICROBALANCE

BACKGROUND OF THE INVENTION

1. Technical Field

This invention relates generally to instrumentation for mass measurement and more particularly to a suspension system for an oscillating element microbalance which effectively decouples the microbalance from its environment and improves the instrument's mass resolution.

2. Background Information

An extremely sensitive microbalance employing an oscillating tapered element and capable of accurately measuring the mass of very fine particles and other matter, has previously been developed. This instrument employs a tapered elongate elastic element having a first end which is adapted to support a specimen and a second larger end which is anchored so that the first end and specimen carried thereby are free to oscillate. The elongate element is excited into oscillation at a resonant frequency. The resonant frequency of the oscillating element varies in accordance with the mass loading and accordingly can be monitored and measured to determine the mass of the specimen supported by the oscillating element. Details of construction and the operating principles of such an oscillating tapered element microbalance are described in U.S. Pat. No. 3,926,271, issued Dec. 16, 1975 to H. Patashnick. An improvement which facilitates use of the microbalance for the measurement of the mass of particulate or other forms of matter contained within a medium such as air or other fluids is described in U.S. Pat. No. 4,391,338 issued on July 5, 1983 to H. Patashnick and G. Rupprecht. The contents of these two patents are incorporated by reference herein.

In practice the oscillating tapered element microbalance has proven to be a highly accurate instrument which permits on-line, real-time direct measurement of particulate mass with great sensitivity and reliability. The instrument has been successfully employed in the evaluation of diesel exhaust, dust concentration and smoke measurement and is applicable to many other situations in which particles or other extremely fine forms of matter need to be detected and weighed.

The tapered element in the above-described microbalance vibrates in a clamped/free mode. This means that at the clamped end, where the tapered element meets the housing, two problems have to be confronted. First the vibration of the tapered element causes a strain on the support system, with the result that energy flows out from the tapered element through the housing into the support system, lowering the mechanical quality factor, Q, of the tapered element. Secondly, mechanical perturbations from the environment enter through the support system and housing, changing the phase and amplitude of the tapered element vibration, and thereby degrading the accuracy of the frequency determination and the mass resolution of the instrument. These two problems are not entirely unrelated because a decrease in the Q also has the effect of allowing a broader spectrum of environmental mechanical noise to enter the microbalance.

One approach for coping with these problems has been to attach the housing of the microbalance to a larger rigid distributed mass which is then decoupled by standard means such as a foam rubber cushion from the noisy environment. Although a three-dimensional decoupling of the tapered element from environmental noise can thus be achieved, this approach is rather cumbersome and not fit for certain applications. Further, the results are far from ideal, since it has been found that decoupling from environmental noise is not simultaneously achieved with a high Q and therefore compromises are necessary.

A need thus exists for an arrangement that simultaneously solves the two problems described above, thereby allowing the full potential of the microbalance to be realized.

SUMMARY OF THE INVENTION

This need is satisfied, according to the present invention, by the provision of a strategically placed suspension system. More particularly, the housing of the microbalance is suspended from a support member by suspension means aligned with an instant center of rotation of the microbalance. The location of the instant center of rotation is a function of the microbalance's mass moment of inertia, total mass and the distance from its center of gravity to the element's free end. With such a suspension system, internal vibrational energy is prevented from leaving the microbalance while external noise is simultaneously prevented from entering, thereby effectively decoupling the microbalance from its environment.

Further, the inventors have discovered that by specially configuring the tapered element, decoupling need only be provided in one direction. In a preferred embodiment, the free portion of the tapered element is provided with an elliptical cross section, and a pair of torsion bars extending along a suspension axis which intersects the instant center of rotation and is parallel to the major axis of the elliptical cross section is employed to suspend the housing of the microbalance. The invention also contemplates the use of a plurality of spring means as suspending means in a three-dimensional decoupling system, as well as the method of mechanically decoupling the oscillating element microbalance.

Accordingly a principal object of the invention is to improve the mass resolution of an oscillating element microbalance by effectively isolating it from environmental noise.

Another object is to simultaneously maintain a high Q of the oscillating element of the microbalance.

A further object is to accomplish this improvement in performance and decoupling with a suspension system that is simple, rugged, relatively inexpensive, and usable in the many diverse applications and environments in which the microbalance can be employed.

Yet another object is to provide a novel method for decoupling an oscillating element microbalance to minimize vibrational losses while at the same time rendering mechanical noise ineffectual.

Still another object is to provide extremely sensitive mass measuring apparatus capable of measuring minute particles and of operating in real-time, on-line, in a wide variety of environments for scientific and/or industrial purposes.

Yet another object is to provide such apparatus which is compact in size, versatile in use and economical to manufacture, operate and maintain.

BRIEF DESCRIPTION OF THE DRAWINGS

These and other objects, features and advantages of the invention will be more readily understood from the following detailed description when read in conjunction with the accompanying drawings, in which:

FIGS. 2a-d and 3a-c are schematic illustrations helpful in understanding the principles of the present invention.

DETAILED DESCRIPTION

Figure 1:
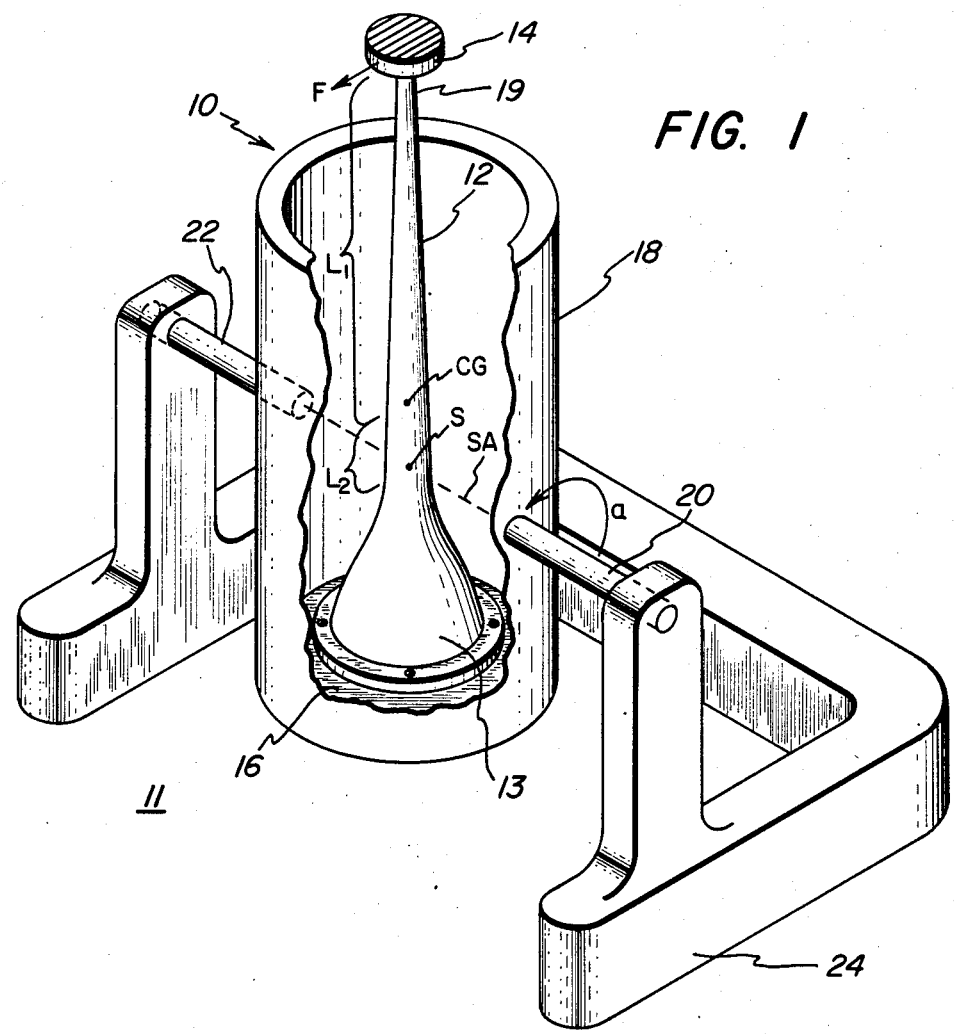
FIG. 1 is a simplified, partially cut-away perspective view of an oscillating tapered element microbalance employing the decoupling suspension system of the present invention.

A preferred embodiment of the improved mass measuring apparatus of the present invention is illustrated in simplified form in FIG. 1. The apparatus includes an oscillating element microbalance 10 mounted and supported by a suspension system generally denoted 11.

Microbalance 10 includes an elongate elastic element 12. Element 12 is preferably tapered as shown and hollow. The larger end 13 of element 12 is anchored to the base 16 of housing 18. Although illustrated as cylindrical, housing 18 may take other shapes and configurations and is designed to at least partially enclose tapered element 12 and provide a convenient attachment point for the suspension system.

A specimen supporting substrate or filter 14 is located atop the other end 19 of tapered element 12. End 19 and the mass supported thereon are free to oscillate relative to housing 18 when excited by drive means (not shown). The frequency of element oscillation is detected and measured by suitable means (not shown).

Briefly, in operation the free end 19 of tapered element 12 is excited into oscillation at a resonant frequency. When mass is added to the free end of the oscillating element, the resonant frequency shifts downward with the magnitude of the frequency change being dependent on the mass loading. Thus, by monitoring and measuring the variation in the resonant frequency of the oscillating tapered element, very accurate mass determinations can be made. Details of the construction and operating principles of the oscillating tapered element microbalance are presented in earlier mentioned U.S. Pat. Nos. 3,926,271 and 4,391,338 and accordingly are not repeated herein.

Also shown in FIG. 1 is a preferred form of the suspension system 11 of the present invention. The suspension system includes a support member 24 and a pair of torsion bars 20 and 22. The torsion bars connect support 24 to housing 18 and serve as suspension means for the microbalance. The torsion bars preferably possess a high Q and may, for example, be made of hollow steel tubing. The outer ends of the torsion bars are fixedly secured to support 24 and the inner ends are fixedly attached to housing 18 in any well known manner.

As shown, the torsion bars 20 and 22 extend along a suspension axis SA which intersects a point S. S represents an instant center of rotation which, as more fully explained below, is located a distance $L_2$ below the center of gravity, CG, of the microbalance. The center of gravity is located a distance $L_1$ below the mass to be measured atop the free end of the tapered element.

The torsion bars limit movement of the microbalance to rotation about suspension axis SA, for example, in the direction, a, in response to a force F applied to a mass atop the tapered element. The torsion bars serve to provide a restoring torque and, as more fully discussed below, effectively decouple the microbalance from its environment.

Analysis of the decoupling process by the inventors has revealed that, disregarding second order effects, decoupling need only be achieved in a plane perpendicular to the longitudinal axis of the tapered element. Moreover, the inventors have found that this two-dimensional decoupling can be reduced further to a one-dimensional decoupling provided that the tapered element is formed in such a way that its vibration is restricted to one direction. This can be accomplished by providing the free portion of the tapered element with an elliptical cross section.

An example of a tapered element having an elliptical cross section throughout a portion of its length is shown in FIG. 2a. Tapered element 12 is hollow and supports a substrate or filter 14 on which is mounted a specimen 25, the mass of which is to be measured. The other, enlarged end of element 12 is anchored to base 16 of the housing of the microbalance. Plan views of the tapered element 12 at planes 2b, 2c and 2d are illustrated in FIGS. 2b, 2c and 2d, respectively. As shown, the tapered element 12 has an elliptical cross-sectional form beginning at its free end and extending throughout most of its length. The span of tapered element 12 between planes 2c and 2d exhibits a transition from an elliptical to a circular cross section.

Also shown in FIG. 2c are the two principal directions of vibration of element 12. The "soft" direction SD is the direction in which the vibration can be easily excited and which points in the direction of the minor axis of the elliptical cross sections. The "hard" direction HD is the direction of the major axis, which is difficult to excite. The preferred mode of oscillation is then in the "soft" direction, i.e. in the direction of the minor axis of the ellipse. An excitation of a vibration in the "hard" direction, i.e. in the direction of the major axis, is highly supressed in this configuration so that, for all practical purposes, a random translational displacement of the support member will only have an effect in the "soft" direction.

Referring briefly once again to FIG. 1, it will be noted that torsion bars 20 and 22 are affixed to opposite sides of the housing 18 in such a way that the microbalance is allowed to rotate around a suspension axis SA which is perpendicular to the preferred "soft" direction of the tapered element's oscillation (i.e. SA is parallel to the major axis of the elliptical cross section). Furthermore, suspension axis SA intercepts point S which represents an instant center of rotation of the microbalance. This instant center of rotation is independent of force F acting in the "soft" direction and of the mass m to be measured. The instant center of rotation S refers to a point or location on the longitudinal axis of tapered element 12 which would experience pure rotation, i.e. no translation, were the microbalance operated unsupported in a gravity free environment. This point is located at a distance $L_2$ from the center of gravity CG where:

$$L_2 = I/ML_1 \tag{1}$$

where I is the mass moment of inertia of the microbalance in respect to the center of gravity, M represents the total mass of the microbalance and $L_1$ is the distance between the mass m at the free end of the tapered element and the center of gravity CG. Since $L_1$ and M can be measured and the mass moment of inertia, I, can either be calculated or determined experimentally, the proper location of the torsion bar suspension of the housing can be determined to be $L_2$ from the center of gravity. The attachment of the torsion bars along an axis extending through the instant center of rotation minimizes the loss of vibrational energy to the support member since the torsion bar material can be selected to minimize mechanical damping. This critical placement of the torsion bars also prevents external environmental noise from entering the microbalance.

The derivation of the length $L_2$ as a function of M, $L_1$ and I will now be described with reference to FIG. 3.

Figure 3A:
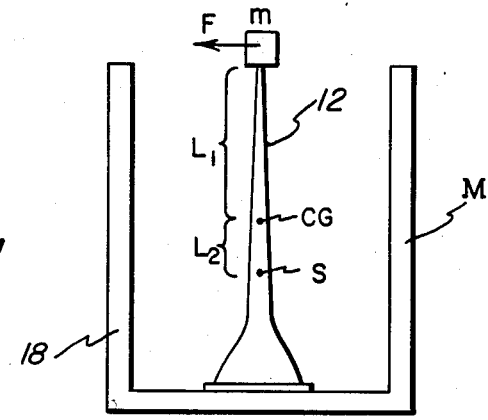
Figure 3B:
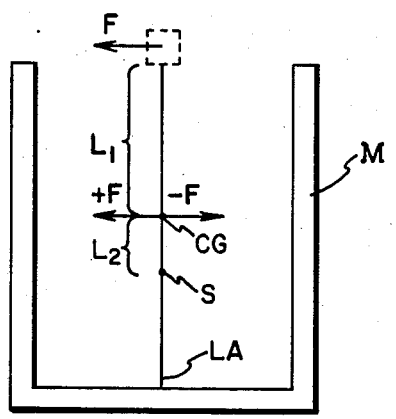
Figure 3C:
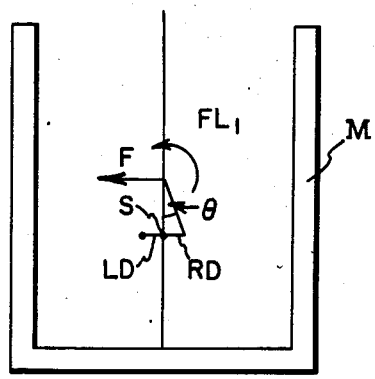

Referring first to FIG. 3a, a tapered element 12, located within a housing 18, is schematically illustrated as supporting a mass m. For purposes of this discussion, the microbalance is considered to have a total mass, M, and the distance between center of gravity, CG, and mass m is calculated to be $L_1$. An inertial force F acts on the mass m perpendicular to the longitudinal axis, LA, of the tapered element, as shown in FIG. 3a. The forces acting on the system can be augmented by cancelling forces +F and −F acting at the center of gravity as shown in FIG. 3b. This distribution of forces is equivalent to a combination of the force F at the center of gravity and a torque $FL_1$ as shown in FIG. 3c.

Next, the displacement of a point S below the center of gravity will be calculated. There are two opposite displacements acting simultaneously on point S: a displacement to the left LD caused by the force F in FIG. 3c and a displacement to the right RD introduced by the rotation of the housing around the center of gravity caused by the torque $FL_1$. One finds:

$$LD = \frac{1}{2} at^2 = \frac{F}{2M} t^2 \quad (2)$$

since the acceleration $a = F/M$, and $$RD = \theta L_2 = \frac{1}{2} \alpha t^2 L_2 = \frac{FL_1L_2}{2I} t^2 \quad (3)$$

since the angular acceleration $\alpha = FL_1/I$.

The point S does not move under the influence of the force F at m, and is therefore an instant center of rotation if LD=RD. Substituting equations (2) and (3) and reducing leads to the following relationship $$\frac{1}{M} = \frac{L_1L_2}{I}, \text{ or} \quad (4)$$

$$L_2 = \frac{I}{ML_1} \quad (1)$$

By the same approach it can be shown that horizontal force F applied at S, which is equivalent to an acceleration of the device suspension transmitted through the torsion bars, has an instant center of rotation at the mass m located at the distance $L_1$ from the center of gravity. Therefore environmental noises acting in the direction of the "soft" vibration of the tapered element do not lead to a relative motion between the mass m and the housing. This means that with the suspension introduced by this invention the tapered element cannot be excited into vibration by environmental noise, which is equivalent to a complete decoupling.

Figure 4:
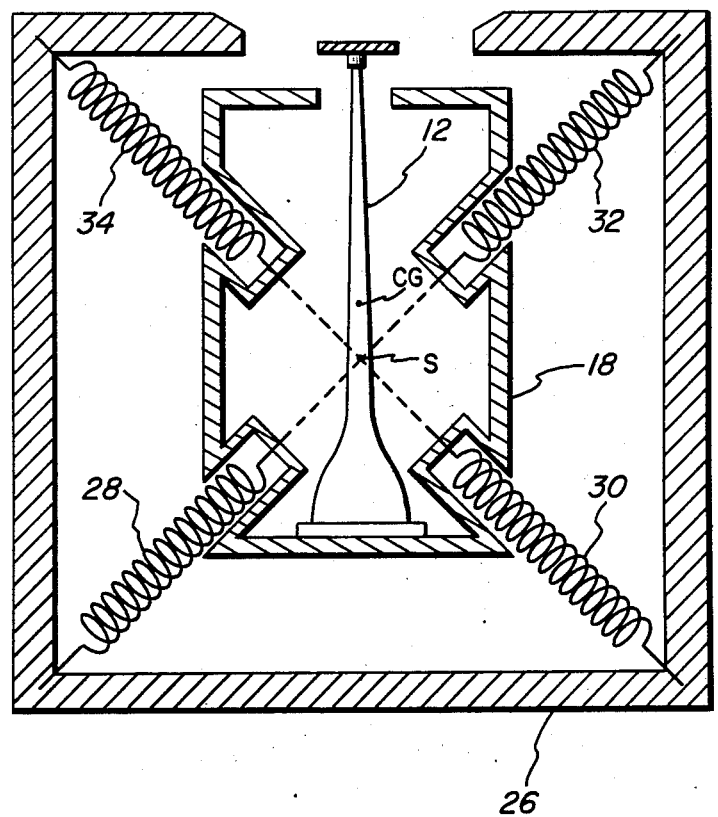
FIG. 4 is a schematic illustration of another embodiment of the invention.

An alternate suspension system for decoupling the microbalance in three-dimensions is illustrated schematically in FIG. 4. Microbalance housing 18 incorporating tapered element 12 is suspended within a cage-like support structure 26 by a set of peripherally spaced springs (or their equivalent). Although only four springs 28, 30, 32 and 34 are shown, typically eight such springs would be employed. In the illustrated example, the spring attachments at the inner ends are brought close to point S by placing them in recesses of housing 18 to achieve a small restoring torque, while the outer ends of the springs are attached to the cage-like support structure 26. In accordance with the principles of the invention, the springs are aligned along axes that intersect at the instant center of rotation S. Of course, other equivalent structures can be used to implement the suspension system of the present invention.

In summary, the suspension system of this invention prevents internal vibrational energy from escaping and simultaneously prevents external noise from entering the microbalance. It decouples the microbalance from its environment by simultaneously overcoming the two identified difficulties associated with existing oscillating element microbalances. The invention thus serves to maintain the high Q of the tapered element and significantly improves the performance of the microbalance. In conjunction with a tapered element having an elliptical cross section, a pair of torsion bars can be employed to simply and effectively implement the invention and achieve the other objects set forth hereinbefore. A microbalance incorporating the suspension system of this invention has been found to have a mass resolution of $5 \times 10^{-9}$ grams where m=50 milligrams.

Although the invention has been described in terms of two embodiments, it will be readily apparent to those skilled in this art that various modifications, rearrangements and substitutions can be made without departing from the spirit of the invention; for example, a gimballed system could be employed to achieve three-dimensional decoupling. The scope of the invention is defined by the claims appended hereto.

What is claimed is:

1. Mass measuring apparatus comprising:
    a microbalance having an elongate elastic element which can be excited to oscillate at a resonant frequency, said element having a longitudinal axis, one end of said element being available to support a specimen to be measured and being free to oscillate, the other end of said element being anchored to the base of a housing, the housing at least partially enclosing said element, the mass of said specimen being measured by monitoring changes in the resonant frequency of the oscillating element;
    a support member; and
    suspension means connected to and between said support member and housing for suspending said microbalance from said support member, said suspension means extending along a first axis which intersects an instant center of rotation of said microbalance, said instant center of rotation comprising a single location on said longitudinal axis which would experience no translation were the microbalance operated unsupported in a gravity free environment, whereby vibration losses from the oscillating element and external mechanical perturbations to the microbalance are minimized.

2. The mass measuring apparatus of claim 1 wherein the instant center of rotation is located a distance $L_2$ from the center of gravity of the microbalance along said longitudinal axis in accordance with the followiug equation:

$$L_2 = I/ML_1$$

where I=the mass moment of inertia of the microbalance in respect to the center of gravity, M represents the mass of the microbalance and $L_1$=the distance along said longitudinal axis of the mass to be measured at the free end of the element from the center of gravity.

3. The apparatus of claim 2 wherein the elongate elastic element tapers from its anchored end to its free end.

4. The apparatus of claim 3 wherein the elongate element is further configured to confine its oscillation to a single dimension.

5. The apparatus of claim 4 wherein the elongate element has an elliptical cross section across its free end and oscillation of the free end of the element is effectively limited to the direction of the minor axis of the elliptical cross section.

6. The apparatus of claim 5 wherein the suspension means comprises a torsion bar arrangement.

7. The apparatus of claim 6 wherein said torsion bar arrangement comprises a pair of torsion bars extending from opposite sides of the housing along a suspension axis passing through the instant center of rotation.

8. The apparatus of claim 7 wherein the suspension axis is parallel to a major axis of the elliptical cross section.

9. The apparatus of claim 7 wherein the torsion bars possess a high Q.

10. The apparatus of claim 3 wherein the suspension means comprises first means for decoupling the microbalance from the support member in three dimensions.

11. The apparatus of claim 10 wherein the first means comprises a plurality of springs, each spring extending along a respective line of action intersecting the instant center of rotation.

12. The apparatus of claim 11 wherein the inner end of each of said plurality of springs is located in a corresponding recess of the housing.

13. A suspension system for effectively decoupling an oscillating element microbalance, the microbalance including an elongate elastic element designed to oscillate at a resonant frequency in a clamped/free mode, the resonant frequency varying with mass loading of a free end of said element and providing a measure of said mass, the suspension system comprising:
   a support member; and
   suspension means connected between said support member and microbalance for suspending the microbalance from said support member, the suspension means extending along a first axis which intersects an instant center of rotation of the microbalance, and the instant center of rotation being located a distance $L_2$ from the center of gravity of the microbalance where $L_2 = I/ML_1$ and I=mass moment of inertia of the microbalance with respect to the center of gravity, M=total mass of the microbalance, and $L_1$=distance from the center of gravity to the mass at the free end of the element.

14. In a mass measuring device comprising an elongate, elastic, tapered, hollow element having a first end which is adapted to support a mass to be measured and a second larger end which is anchored to a housing so that said first end and the mass carried thereby are free to oscillate at a resonant frequency determined by the magnitude of said mass, the improvement comprising:
   a support member; and
   means connected between the support member and housing for suspending the housing from said support member such that the housing is constrained in movement to rotation about one or more axes extending through an instant center of rotation of the device, said instant center of rotation comprising a location which would experience no translation were the element oscillated with its housing unsupported in a gravity free environment.

15. The mass measuring device of claim 14, wherein said element has an elliptical cross section near its first end, and the suspending means comprises a torsion bar arrangement which constrains housing movement to rotation about an axis parallel to a major axis of said elliptical cross section.

16. A method of mechanically decoupling an oscillating element microbalance from its support structure comprising the steps of:
   locating an instant center of rotation of the microbalance, said instant center of rotation comprising a location which would experience only pure rotation were the microbalance to be operated unsupported in a gravity free environment; and
   suspending the microbalance from the support structure along an axis which intersects said instant center of rotation to thereby minimize vibrational losses from the oscillating element while simultaneously preventing environmental noise from entering the microbalance.

17. The method of claim 16 further comprising the step of configuring the oscillating element to confine its oscillation to a single direction; and wherein the suspending step comprises suspending the microbalance along a single axis which is perpendicular to both said single direction and a longitudinal axis of said element.

18. The method of claim 17 wherein the suspending step comprises suspending the microbalance by a torsion bar arrangement extending along said single axis.

* * * * *